US012546565B2

(12) United States Patent
Christiansen

(10) Patent No.: US 12,546,565 B2
(45) **Date of Patent: *Feb. 10, 2026**

(54) RESTROOM STALL FIREARM RECEPTACLE

(71) Applicant: Ned Forrest Christiansen, Three Rivers, MI (US)

(72) Inventor: Ned Forrest Christiansen, Three Rivers, MI (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/838,743

(22) Filed: Jun. 13, 2022

(65) Prior Publication Data

US 2023/0039755 A1 Feb. 9, 2023

Related U.S. Application Data

(60) Continuation of application No. 16/785,257, filed on Feb. 7, 2020, now Pat. No. 11,359,886, which is a division of application No. 15/871,745, filed on Jan. 15, 2018, now Pat. No. 10,591,248.

(60) Provisional application No. 62/446,672, filed on Jan. 16, 2017.

(51) Int. Cl.
*F41C 33/06* (2006.01)
*E04B 2/72* (2006.01)
*E05F 5/06* (2006.01)

(52) U.S. Cl.
CPC ................ *F41C 33/06* (2013.01); *E04B 2/72* (2013.01); *E05F 5/06* (2013.01)

(58) Field of Classification Search
CPC .... F41C 33/06; E05F 5/06; E05F 1/12; E04B 2/72; E05G 2700/00; E05G 2700/02; E05G 1/026; E05G 1/04; E05G 1/005; E05Y 2900/112; Y10T 70/5031; Y10T 70/5035; Y10T 70/554; Y10T 70/5544; Y10T 70/5549; Y10T 70/5553; Y10T 70/5558; Y10T 70/5562; Y10T 70/5566; Y10T 70/5571; Y10T 70/5575; Y10T 70/558; Y10T 70/5584; Y10T 70/5589
USPC ...... 70/63, 158–162; 109/45, 48, 50–52, 58, 109/60, 64, 67, 68; 211/64; 248/551–553; 42/70.11; 52/32, 79.1; 49/70, 394; 206/317; 224/912, 913
See application file for complete search history.

(56) References Cited

U.S. PATENT DOCUMENTS 3,464,606 A * 9/1969 Nordeen .............. A47B 81/005 224/281
4,309,065 A * 1/1982 Pappas ................ F41C 33/0209 224/912

(Continued)

*Primary Examiner* — Suzanne L Barrett
(74) *Attorney, Agent, or Firm* — Larry E. Henneman, Jr.; Henneman & Associates, PLC

(57) ABSTRACT

An example firearm receptacle includes a mounting structure, a firearm holder, and a door stopper. The mounting structure is configured to be fixably mounted to one of a wall or a door. The door stopper is configured to transition between a deployed position and a stowed position. In the example embodiment, the door stopper is configured to impede the opening of the door when the door stopper is in the deployed position and to allow the opening of the door when the door stopper is in the stowed position. The door stopper is additionally configured to prevent the door stopper from transitioning to the stowed position when a firearm is disposed in the firearm holder.

21 Claims, 14 Drawing Sheets

(56) References Cited

U.S. PATENT DOCUMENTS

| | | | | | |
|---|---|---|---|---|---|
| 4,694,668 | A * | 9/1987 | Ciletti | A47G 29/20 | 70/63 |
| 4,788,838 | A * | 12/1988 | Cislo | F41C 33/06 | 5/503.1 |
| 5,016,793 | A * | 5/1991 | Derkatz | F41C 33/00 | 224/150 |
| 5,056,343 | A * | 10/1991 | Kleefeldt | E05B 81/25 | 292/DIG. 3 |
| 5,118,175 | A * | 6/1992 | Costello | E05G 1/02 | 312/271 |
| 5,683,021 | A * | 11/1997 | Setina | B60R 7/14 | 70/283.1 |
| 5,916,087 | A * | 6/1999 | Owens | F41C 33/0227 | 5/503.1 |
| 6,405,861 | B1 * | 6/2002 | Siler | F41C 33/06 | 206/1.5 |
| 6,843,081 | B1 * | 1/2005 | Painter | F41C 33/06 | 42/70.11 |
| 8,074,477 | B1 * | 12/2011 | Weiche | F41C 33/06 | 5/503.1 |
| 9,801,455 | B2 * | 10/2017 | Christoff | F41C 33/0209 | |
| 10,591,248 | B1 * | 3/2020 | Christiansen | E05G 1/005 | |
| 11,359,886 | B2 * | 6/2022 | Christiansen | E04B 2/72 | |
| 2014/0245934 | A1 * | 9/2014 | Delattre | E05G 1/04 | 109/38 |
| 2015/0337562 | A1 * | 11/2015 | Bacarella | G07C 9/30 | 109/38 |
| 2015/0343958 | A1 * | 12/2015 | McGoldrick | E05G 1/04 | 29/428 |

* cited by examiner

RESTROOM STALL FIREARM RECEPTACLE

RELATED APPLICATIONS

This application is a continuation of U.S. patent application Ser. No. 16/785,257 (now U.S. Pat. No. 11,359,886), filed on Feb. 7, 2020 by the same inventor, which is a divisional of U.S. patent application Ser. No. 15/871,745 (now U.S. Pat. No. 10,591,248), filed on Jan. 15, 2018 by the same inventor, which claims the benefit of U.S. Provisional Patent Application No. 62/446,672, filed on Jan. 16, 2017 by the same inventor, all of which are incorporated herein by reference in their respective entireties.

BACKGROUND OF THE INVENTION

Field of the Invention

This invention relates generally to firearm storage, and more particularly to a device for storing a firearm in a restroom stall or other enclosure where it might be necessary to temporarily lay the firearm down.

Description of the Background Art

Using a public restroom can be challenging and unsafe for a firearm carrier. Upon entering the restroom stall, the carrier may wish to remove the firearm from a holster and place it in the safest place possible. Unfortunately, the safest place possible might be on the floor, on the back of a toilet, on a toilet paper dispenser, a coat hook, etc. Consequently, carriers sometimes inadvertently leave the loaded firearm in the stall. As another consequence, firearms often fall from toilets or other storage locations and accidently discharge and/or become damaged.

The prior art fails to adequately address these safety issues.

SUMMARY

The present invention overcomes the problems associated with the prior art by providing a fire arm holder that prevents a firearm from falling and/or being inadvertently left behind. The invention facilitates the safe storage of a firearm during a visit to a restroom stall or other enclosure and impedes exiting the stall while the firearm is still in the enclosure.

An example firearm receptacle includes a mounting structure, a firearm holder, and a door stopper. The mounting structure is configured to be fixably mounted to one of a wall or a door. The door stopper is configured to transition between a deployed position and a stowed position. In the example embodiment, the door stopper is configured to impede the opening of the door when the door stopper is in the deployed position and to allow the opening of the door when the door stopper is in the stowed position. The door stopper is configured to prevent the door stopper from transitioning to the stowed position when a firearm is disposed in the firearm holder.

In a particular embodiment, the door stopper includes a platform hingably coupled to the mounting structure. The platform is configured to rotate no more than ninety degrees when transitioned between the deployed position and the stowed position, and the firearm holder is disposed between a portion of the platform and a portion of the mounting structure. The firearm holder is fastened to the platform and, in an even more particular embodiment, is a collapsible pouch.

An example firearm receptacle additionally includes a latch having a first portion coupled to the mounting structure and a complementary second portion coupled to the platform. The first portion and the second portion are free to engage one another when the firearm holder is empty, and the first portion and the second portion are prevented from engaging one another when a firearm is disposed in the firearm holder.

In an example firearm receptacle, the firearm holder is configured to point a firearm held therein in a downward direction when the door stopper is in the deployed position. Optionally, the firearm holder is formed from flexible ballistic material.

Methods of manufacturing firearm receptacles are also disclosed. One example method for manufacturing a firearm receptacle includes providing a mounting structure configured to be fixably mounted to one of a wall or a door, providing a firearm holder, and providing a door stopper. The door stopper is configured to transition between a deployed position and a stowed position. The example method additionally includes coupling the door stopper to the mounting structure and mounting the firearm holder between the door stopper and the mounting structure. So mounted, the door stopper cannot transition to the stowed position when a firearm is disposed in the firearm holder.

In a particular example method, the step of providing the door stopper includes providing a platform. In addition, the step of coupling the door stopper to the mounting structure includes hingably coupling the platform to the mounting structure. The step of disposing the firearm holder between the door stopper and the mounting structure includes fastening the firearm holder to the platform or the mounting structure. Optionally, the firearm holder is a collapsible pouch.

A more particular example method additionally includes providing a latch including a first portion and a complementary second portion. The method additionally includes coupling the first portion to the mounting structure and coupling the second portion to the platform. In this example method the first portion and the second portion are free to engage one another when the firearm holder is empty, and the first portion and the second portion are prevented from engaging one another when a firearm is disposed in the firearm holder.

Another example method additionally includes providing a limiter to maintain the firearm holder in a predetermined position. In the predetermined position, a firearm disposed in the firearm holder is pointed in a downward direction. Optionally, the step of providing the firearm holder includes forming the firearm holder from flexible ballistic material.

An example walk-in enclosure for use by a person carrying a firearm is also disclosed. The example enclosure includes one or more walls, a door coupled to at least one of the walls, and a firearm receptacle fixed to the door or one of the walls. The firearm receptacle is transitionable between a stowed position and a deployed position. The firearm receptacle is configured to prevent transition from the deployed position to the stowed position while a firearm is disposed in the firearm receptacle, but the firearm receptacle is free to transition into the stowed position while no firearm is disposed in the firearm receptacle. The firearm receptacle impedes the opening of the door of the walk-in enclosure when the firearm receptacle is in the deployed position, but the firearm receptacle does not impede the opening of the door when the firearm receptacle is in the stowed position.

In a particular example walk-in enclosure, the firearm receptacle includes a mounting structure, a door stopper, and a firearm holder. The mounting structure is mounted to one of the walls or the door. The door stopper is disposed to prevent the opening of the door when the firearm receptacle is in the deployed position, and the firearm holder is disposed to prevent the firearm receptacle from transitioning from the deployed position to the stowed position while a firearm is present in the firearm holder.

In a more particular walk-in enclosure, the door stopper includes a platform hingably coupled to the mounting structure, and the firearm holder is fastened to the platform. Optionally, the firearm holder is a collapsible pouch and/or is formed from flexible ballistic material.

In an example embodiment, the walk-in enclosure is a restroom stall. However, the walk-in enclosure can be a dressing room, an office, or any other structure with a door wherein it might be desirable to temporarily put down a firearm.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a firearm holder adapted to be mounted in a restroom stall (or other walk-in enclosure). In the following description, numerous specific details are set forth (e.g., materials, safety features, etc.) in order to provide a thorough understanding of the invention. Those skilled in the art will recognize, however, that the invention may be practiced apart from these specific details. In other instances, details of well-known manufacturing practices (e.g., sheet metal crimping, molding, welding, etc.) and components have been omitted, so as not to unnecessarily obscure the present invention.

Figure 1A:
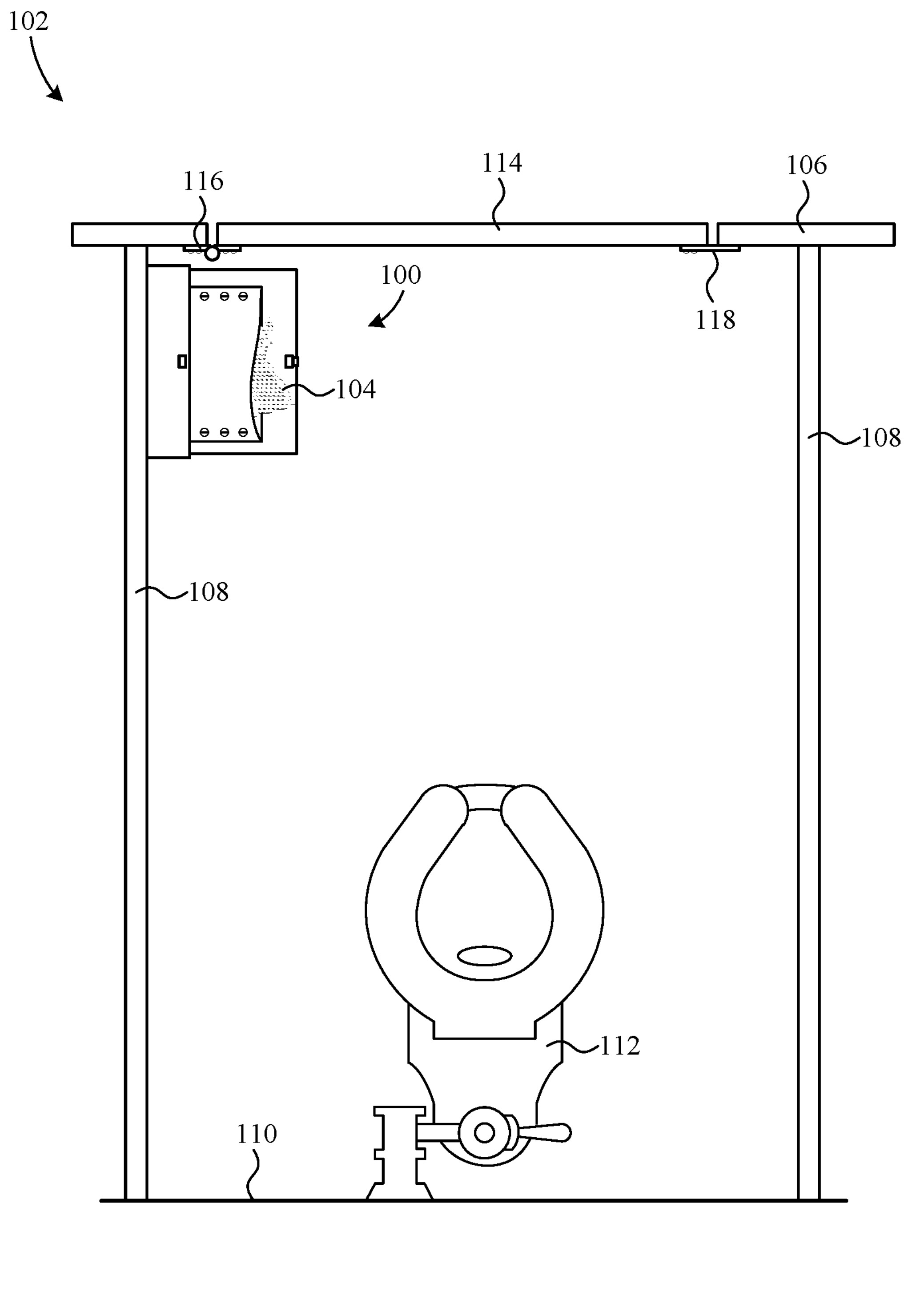
FIG. 1A shows a top view of a firearm receptacle mounted in a walk-in enclosure according to one embodiment of the present invention.

FIG. 1A shows a top view of a firearm receptacle 100 mounted in a walk-in enclosure which, in the example embodiment, is depicted as a restroom stall 102. Firearm receptacle 100 provides a safe place for a firearm carrier to temporarily store a firearm 104, while using stall 102. Firearm receptacle 100 also prevents the firearm carrier from leaving stall 102 without first removing firearm 104 from firearm receptacle 100, thereby preventing the carrier from inadvertently leaving the firearm in stall 102.

Stall 102 includes a front wall 106, two sidewalls 108, and a rear wall 110 having, for example, a toilet 112 connected thereto. Front wall 106 includes an inward swinging door 114 coupled thereto via a hinge assembly 116 and a stop 118. Hinge assembly 116 facilitates the rotation of door 114 with respect to front wall 106 and stop 118 prevents door 114 from swinging out past front wall 106.

Figure 1B:
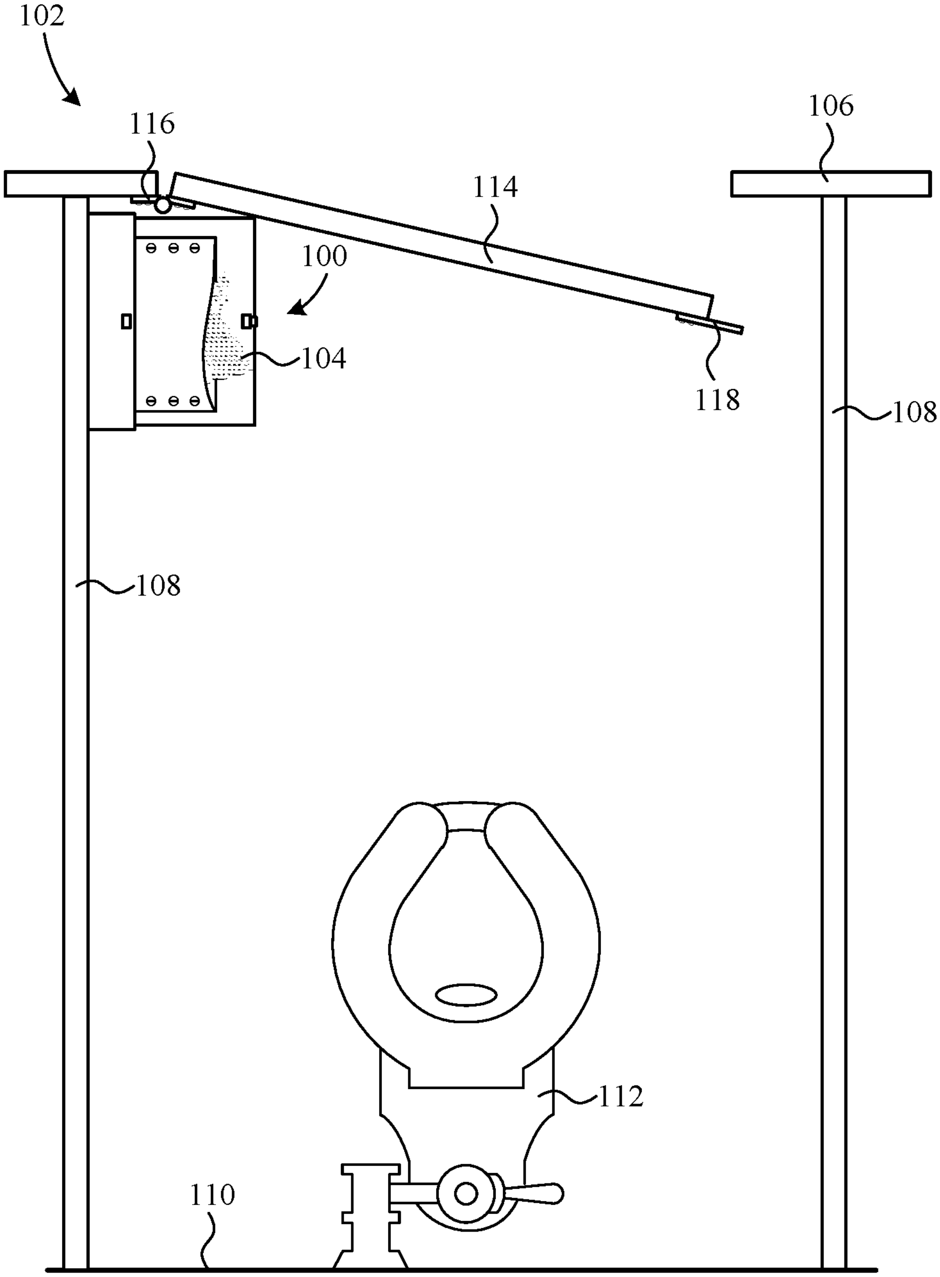
FIG. 1B shows another top view of the firearm receptacle mounted in the walk-in enclosure of FIG. 1A.

FIG. 1B shows a top view of stall 102, wherein firearm receptacle 100 is preventing door 114 from opening when firearm 104 is disposed in firearm receptacle 100. As will be explained with reference to upcoming figures, firearm receptacle 100 cannot be closed unless firearm 104 is removed therefrom. In this example, firearm receptacle 100 is mounted to the left one of sidewalls 108 behind hinge assembly 116 such that firearm receptacle 100 blocks door 114 from opening when firearm 114 is disposed therein. To exit stall 102, the firearm carrier must first remove firearm 104 from receptacle 100 and then close receptacle 100 to allow door 114 to swing open. This prevents firearm carriers from forgetting/leaving their firearm in stall 102.

Figure 1C:
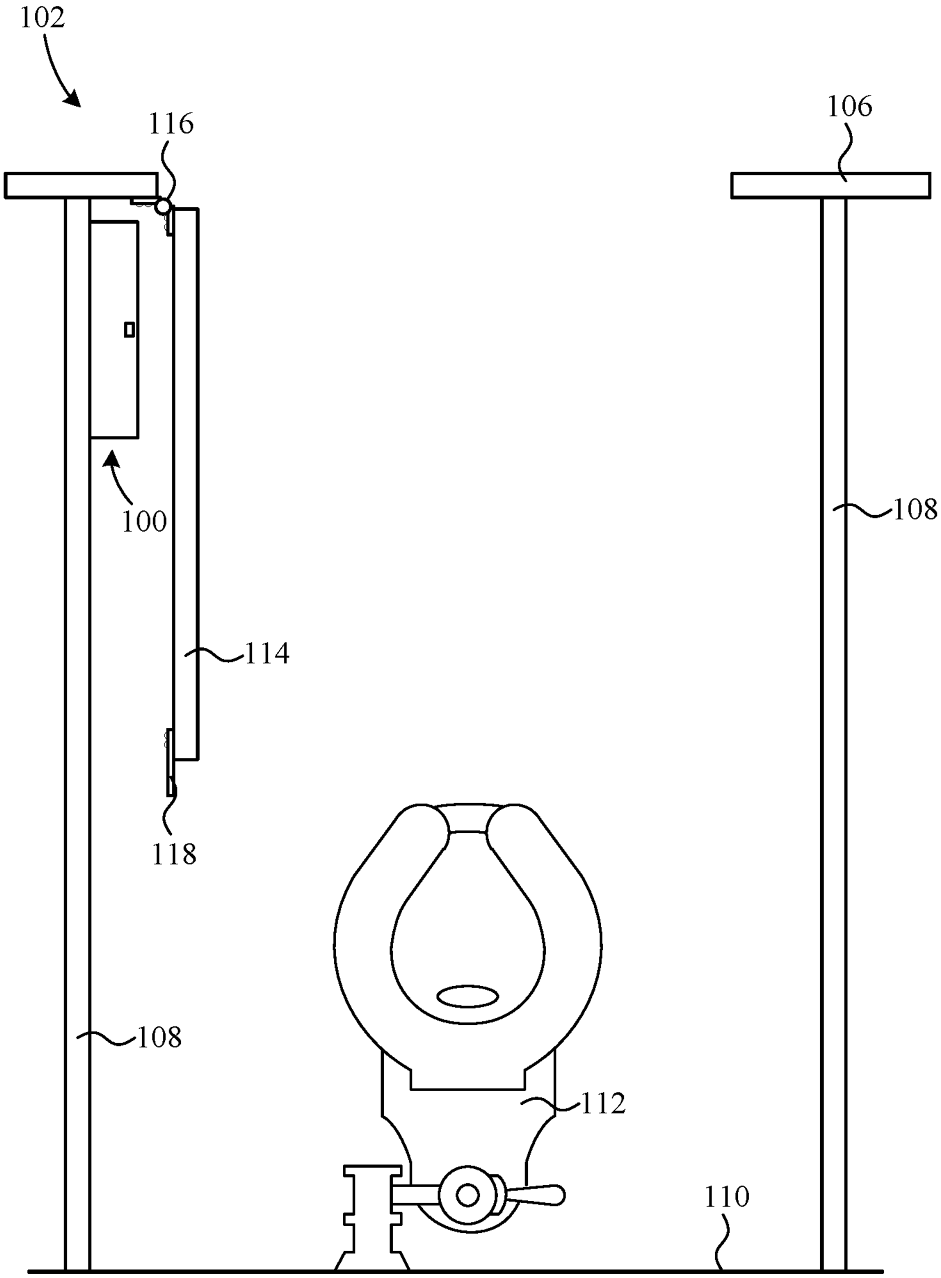
FIG. 1C shows another top view of the firearm receptacle mounted in the walk-in enclosure of FIG. 1A.

FIG. 1C shows a top view of stall 102 when firearm 104 is removed from receptacle 100 and receptacle 100 is in a closed position. As shown, door 114 is free to swing open when receptacle 100 is in a closed position.

Figure 2A:
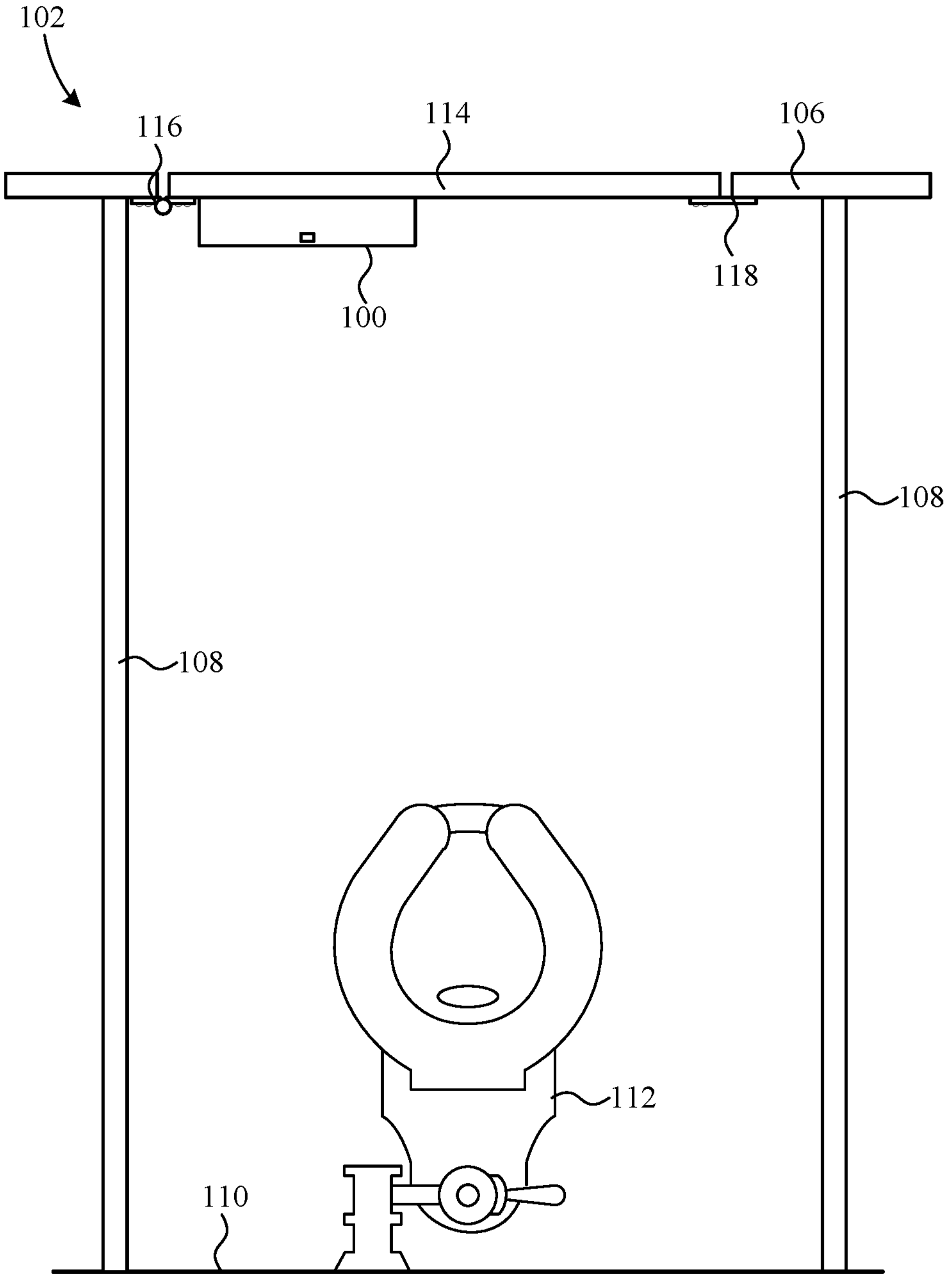
FIG. 2A shows a top view of the firearm receptacle mounted in the walk-in enclosure of FIG. 1A according to another embodiment of the present invention.

FIG. 2A shows a top view of stall 102 wherein firearm receptacle 100 is mounted to the interior of door 114. As shown, receptacle 100 is empty and in a closed position such that door 114 is free to swing open. Indeed, users are free to enter and exit stall 102 when receptacle 100 is not in use.

Figure 2B:
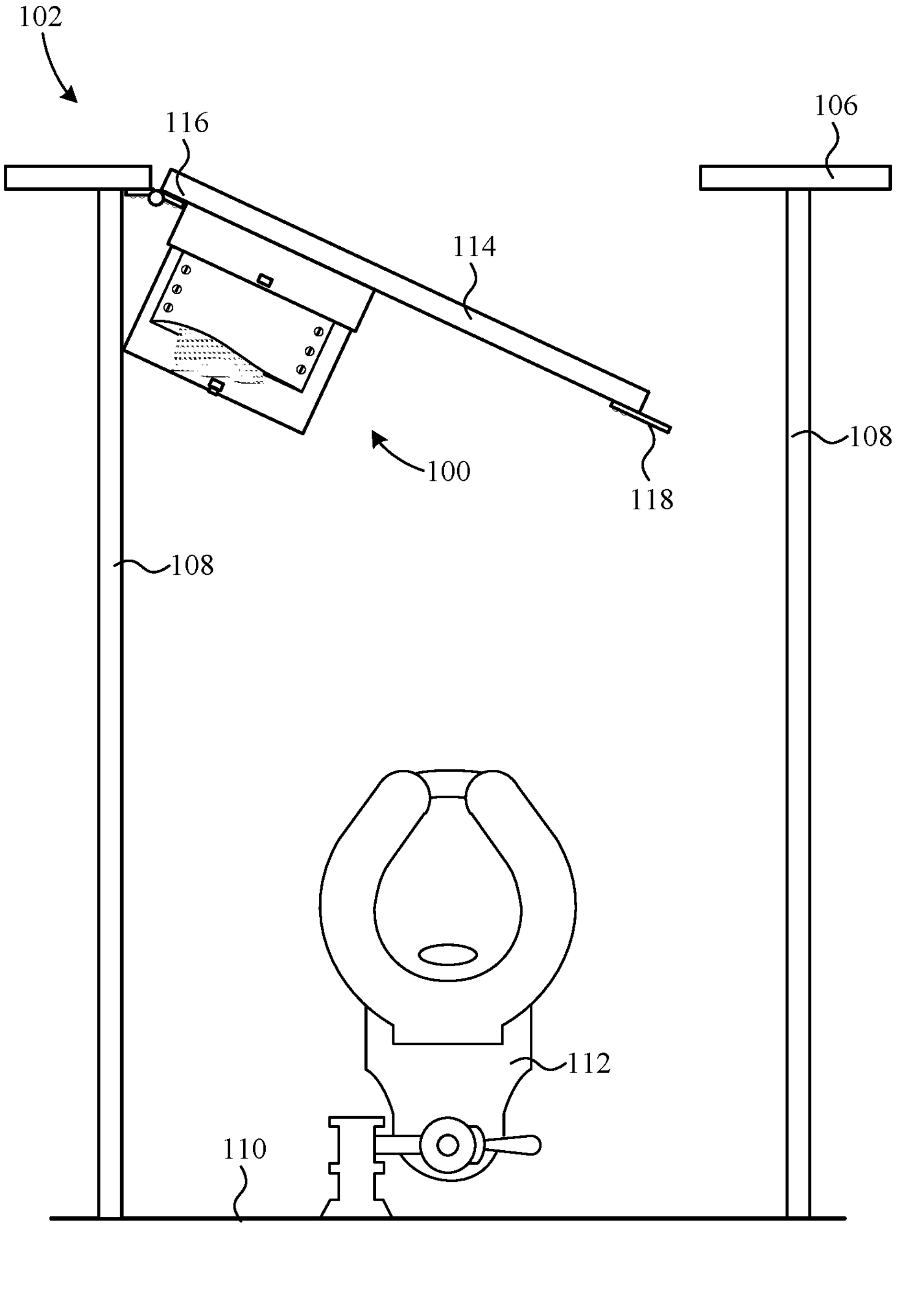
FIG. 2B shows another top view of the firearm receptacle mounted in the walk-in enclosure of FIG. 2A.

FIG. 2B shows a top view of stall 102 wherein firearm receptacle 100 is mounted to the interior of door 114 and shown deployed. When firearm 104 is disposed in receptacle 100 and, therefore, deployed, door 114 is prevented from opening because receptacle 100 engages the left one of sidewalls 108.

Figure 3A:
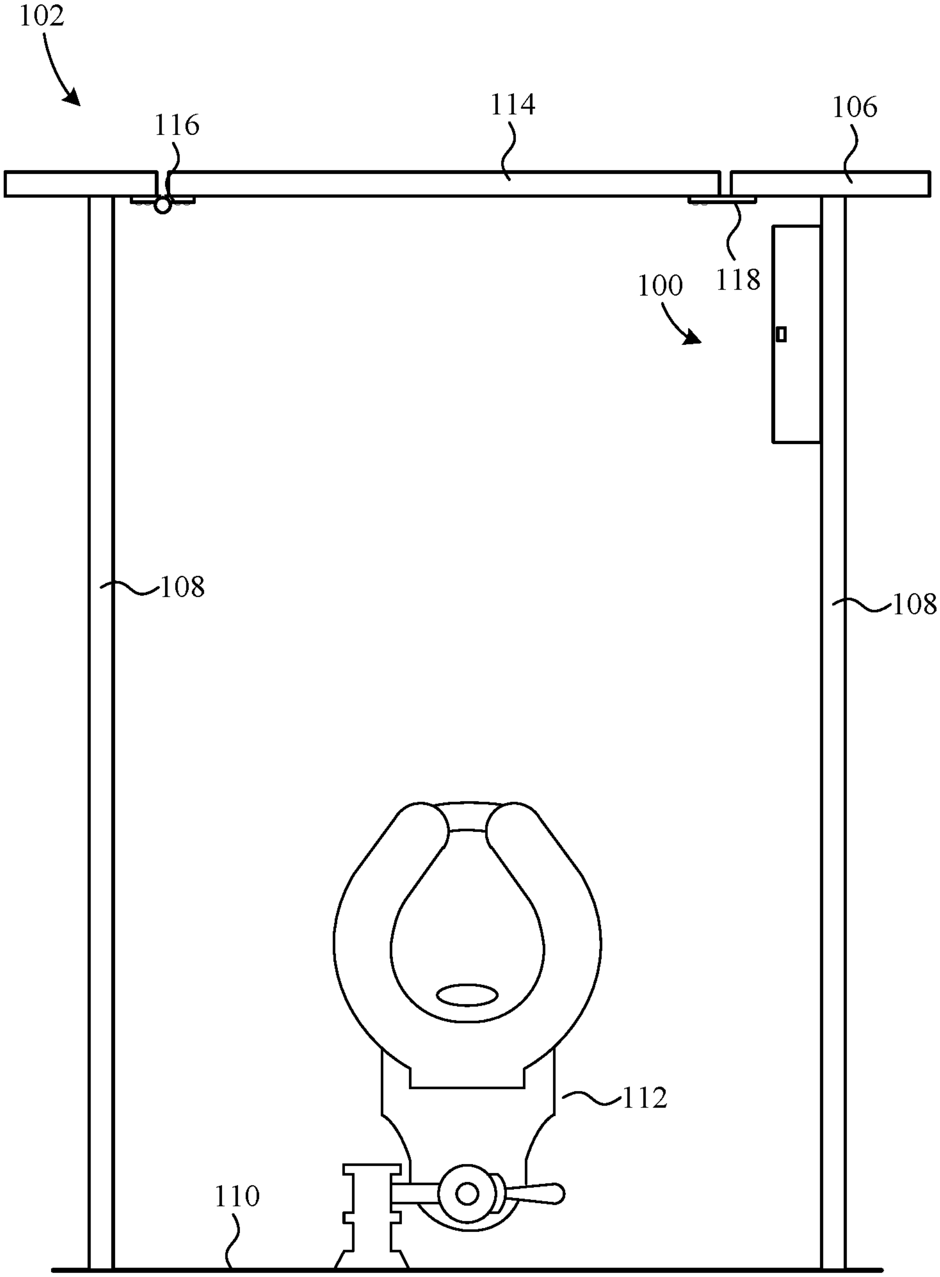
FIG. 3A shows a top view of the firearm receptacle mounted in the walk-in enclosure of FIG. 1A according to another embodiment of the present invention.

FIG. 3A shows a top view of stall 102 wherein firearm receptacle 100 is mounted to the right one of sidewalls 108. As shown, receptacle 100 is empty and in a closed position such that door 114 is free to swing open.

Figure 3B:
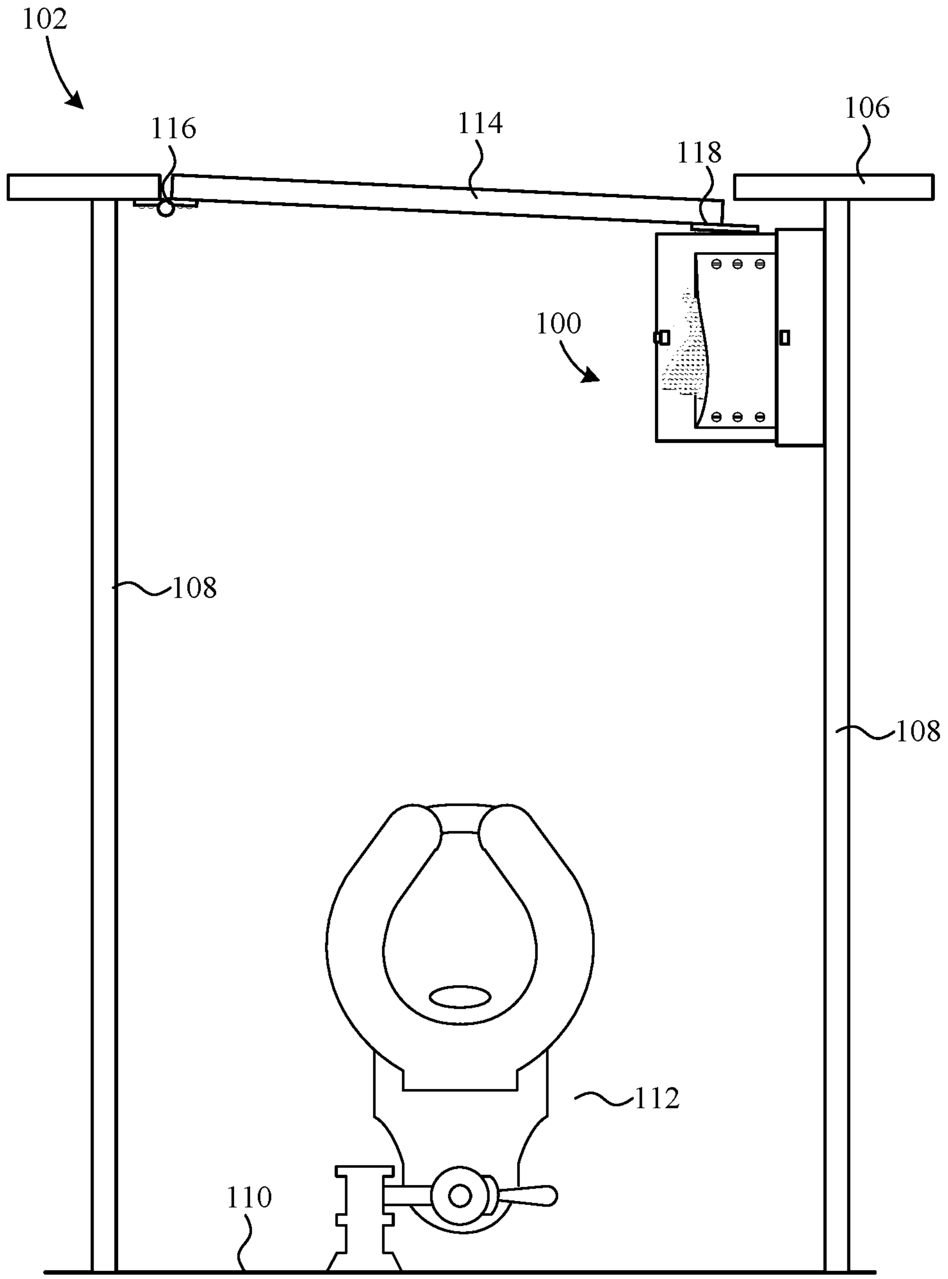
FIG. 3B shows another top view of the firearm receptacle mounted in the walk-in enclosure of FIG. 3A.

FIG. 3B shows a top view of stall 102 wherein firearm receptacle 100 is mounted to the right one of sidewalls 108 and shown deployed. When firearm 104 is disposed in receptacle 100 and deployed, door 114 is blocked from being opened.

In the preceding examples, stall door 114 is an inwardly swinging door, and firearm receptacle 100 blocks door 114 from swinging inwardly when in a deployed position. However, alternate embodiments can be configured to work with outwardly swinging doors. For example, receptacle 100 can include an engagement mechanism to engage the door (or a complementary engagement mechanism fixed to the door), when the receptacle is in a deployed position, to prevent the door from opening outwardly. The engagement mechanism will disengage from the door (or the complementary engagement mechanism) when the firearm is removed and the receptacle is transitioned to a stowed position.

Figure 4A:
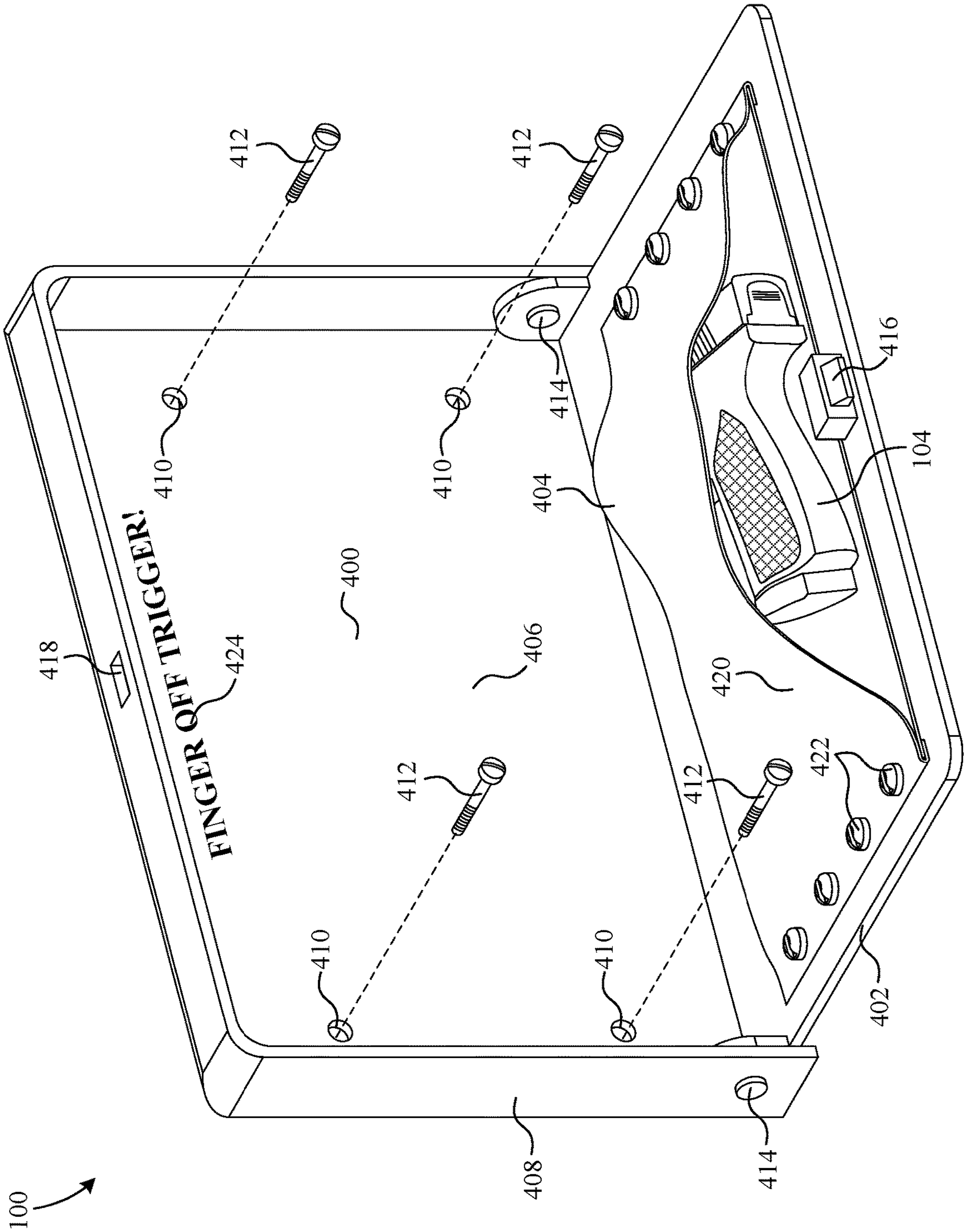
FIG. 4A is a perspective view of the firearm receptacle of FIG. 1A in an open position.

FIG. 4A shows a perspective view of firearm receptacle 100 removed from stall 102, in a deployed position, and having firearm 104 disposed therein. Receptacle 100 includes a mounting structure 400, a door stopper 402, and a firearm holder 404.

Mounting structure 400 facilitates the mounting of receptacle 100 to structures such as, for example, walls, doors, etc. Furthermore, mounting structure 400 includes a rectangular plate 406 and a set of sidewalls 408 extending therefrom. Plate 406 includes a plurality of apertures 410 that facilitate the mounting of plate 406 to, for example, a wall via a respective set of screws 412. Mounting structure 400 is connected to stopper 402 via a set of hinge assemblies 414 that allow stopper 402 to be rotated into a stowed position by lifting upward or opened by pulling downward.

Door stopper 402 is plate configured to fold down and support a firearm while also preventing a door from opening when in a deployed position. Stopper 402 includes a latch assembly 416 that is configured to engage an aperture 418 formed in one of sidewalls 408. Latch 416 secures stopper 402 in a closed (stowed) position when there is no firearm disposed in holder 404. The dimensions of sidewalls 408 are generally narrower than the width of a handgun, so that any handgun positioned in firearm holder 404 would prevent stopper 402 from being rotated into the stowed position. When latch 416 is not engaged with aperture 418, gravity will maintain stopper 402 in an open (deployed) position. In the example embodiment, stopper 402 has a rotational range of 90 degrees.

Firearm holder 404 is a flexible pouch configured to receive a variety of firearms. In this example, holder 404 is a section of ballistic fabric (Kevlar) 420 that is fastened together and mounted directly to stopper 402 via a set of screws 422.

In the example embodiment, receptacle 100 further includes instructions/reminders 424 printed on mounting structure 400. For example, instructions/reminders 424 could include the text "FINGER OFF TRIGGER". As another example, the inside of receptacle 100 can be painted with some suitable attention-getting feature such as, for example, red and white diagonal stripes, safety DayGlo green, etc. Receptacle 100 can also have other features such as LED lighting that turns on when receptacle 100 is in the open position.

Figure 4B:
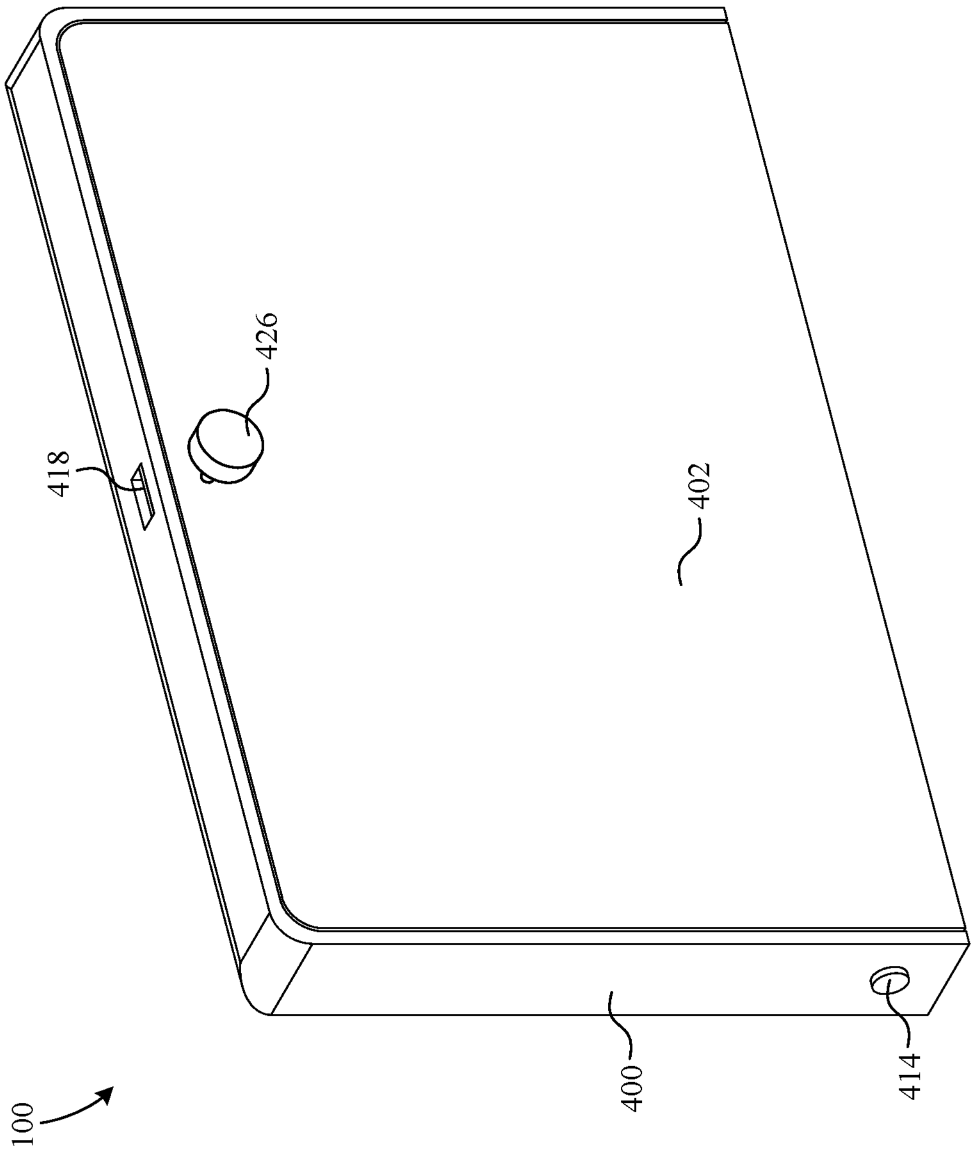
FIG. 4B is a perspective view of the firearm receptacle of FIG. 4A in a closed position.

FIG. 4B shows a perspective view of firearm receptacle 100 in a stowed position. As shown, the closed-position width of receptacle 100 is such that stopper 402 can only be closed when there is no firearm disposed in holder 404. In other words, the width of a firearm is greater than the distance between mounting structure 400 and stopper 402 when receptacle 100 is closed. Therefore, a firearm disposed in holder 404 obstructs the closing of stopper 402.

Firearm receptacle 100 further includes a handle 426 attached to stopper 402 to facilitate the opening of receptacle 100.

Figure 5:
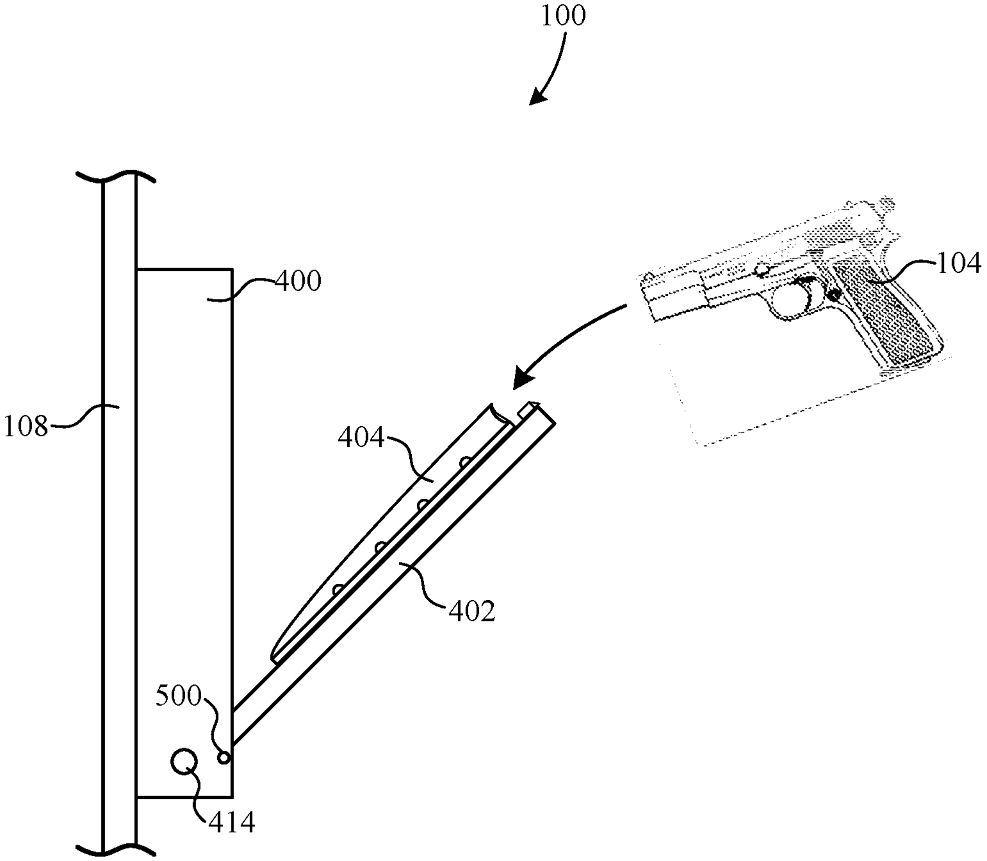
FIG. 5 is a side view of the firearm receptacle of FIG. 1A according to another embodiment of the present invention.

FIG. 5 shows a side view of firearm receptacle 100 according to another embodiment of the present invention. In this particular embodiment, receptacle 100 includes a limiter pin 500 for limiting the angle at which stopper 402 rests when in the open position. In this case, the angular range is limited to 45 degrees. One benefit to limiter pin 500 is that the barrel of firearm 104 disposed in holder 404 will maintain a safer downward angle. This helps prevent firearm 104 from being knocked out of holder 404 when receptacle 100 is bumped or shaken. In addition, in the case of an accidental discharge, the direction that firearm 104 is pointing is at least partially downward and, therefore, less likely to strike a nearby person.

A person having ordinary skill in the art will readily recognize firearm 104 as a BROWNING HI-POWER™ pistol as manufactured by Browning Corporation. As discussed above, firearm receptacle 100 cannot be closed when firearm 104 is disposed in holder 404, because the width of the example firearm is greater than the distance between mounting structure 400 and stopper 402. Therefore, at least in the example embodiment, the closed-position width of receptacle 100 is at most smaller than the width of a BROWNING HI-POWER™.

Figure 6:
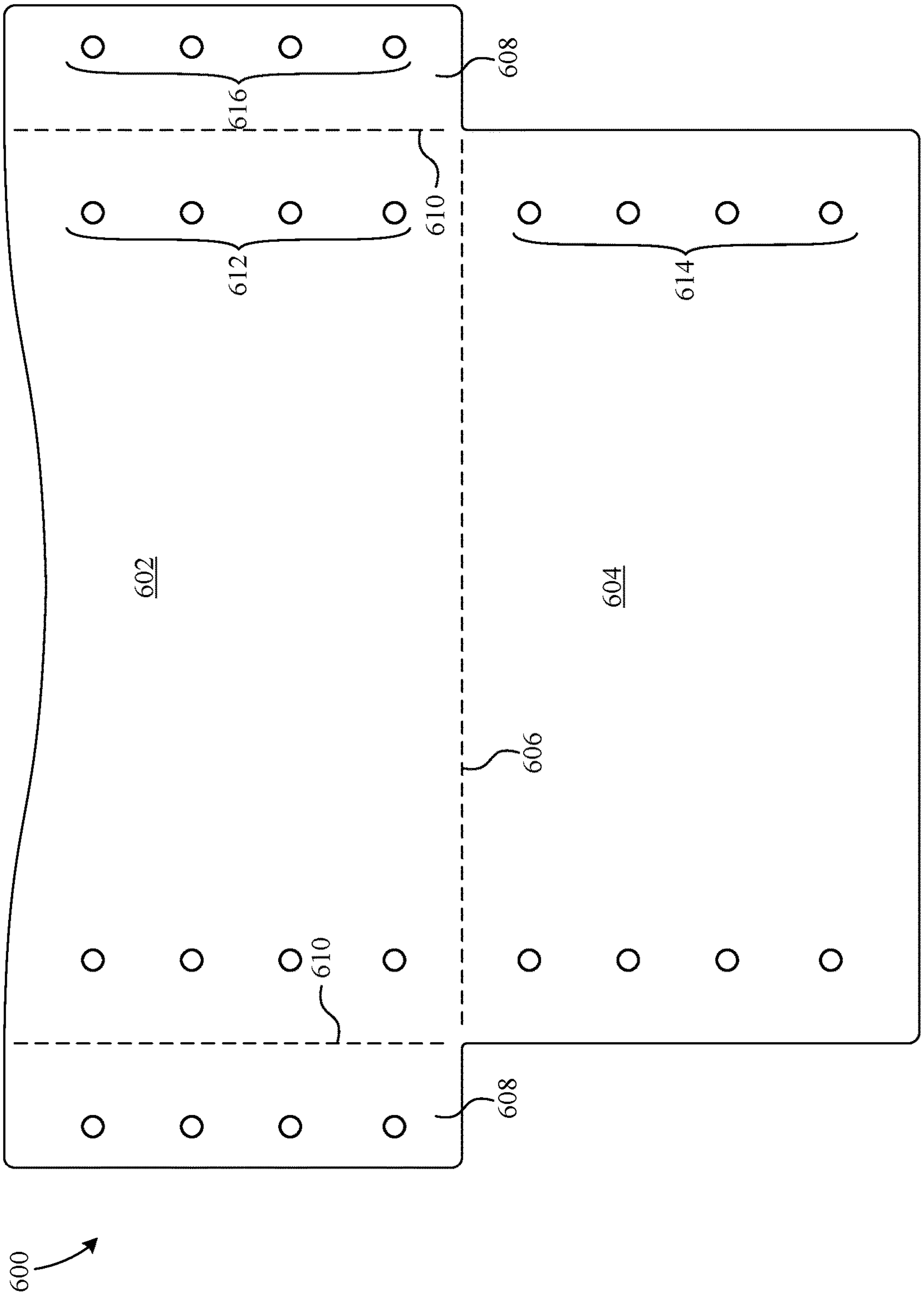
FIG. 6 is a top view of a blank used to form the firearm holder of the firearm receptacle of FIG. 1A.

FIG. 6 shows a top view of a ballistic fabric (e.g., Kevlar) blank 600, from which holder 404 is formed. In this example, blank 600 includes a front section 602 and a rear section 604 having a fold line 606 therebetween. Front section 602 defines a set of side tabs 608, each having a respective fold line 610 between the respective side tabs 608 and the central portion of front section 602. Front section 602 includes a set of apertures 612 that align with a respective set of apertures 614 of rear section 604.

The mounting of blank 600 to stopper 402 is described as follows. Blank 600 is folded in half by folding blank 600 along line 606. Then, side tabs 608 are folded around rear section 604 along lines 610. With apertures 612 aligned with respective apertures 614 and apertures 616 of side tabs 608, holder 404 is mounted to stopper 402 via screws 422 (shown in FIG. 4A).

Figure 7:
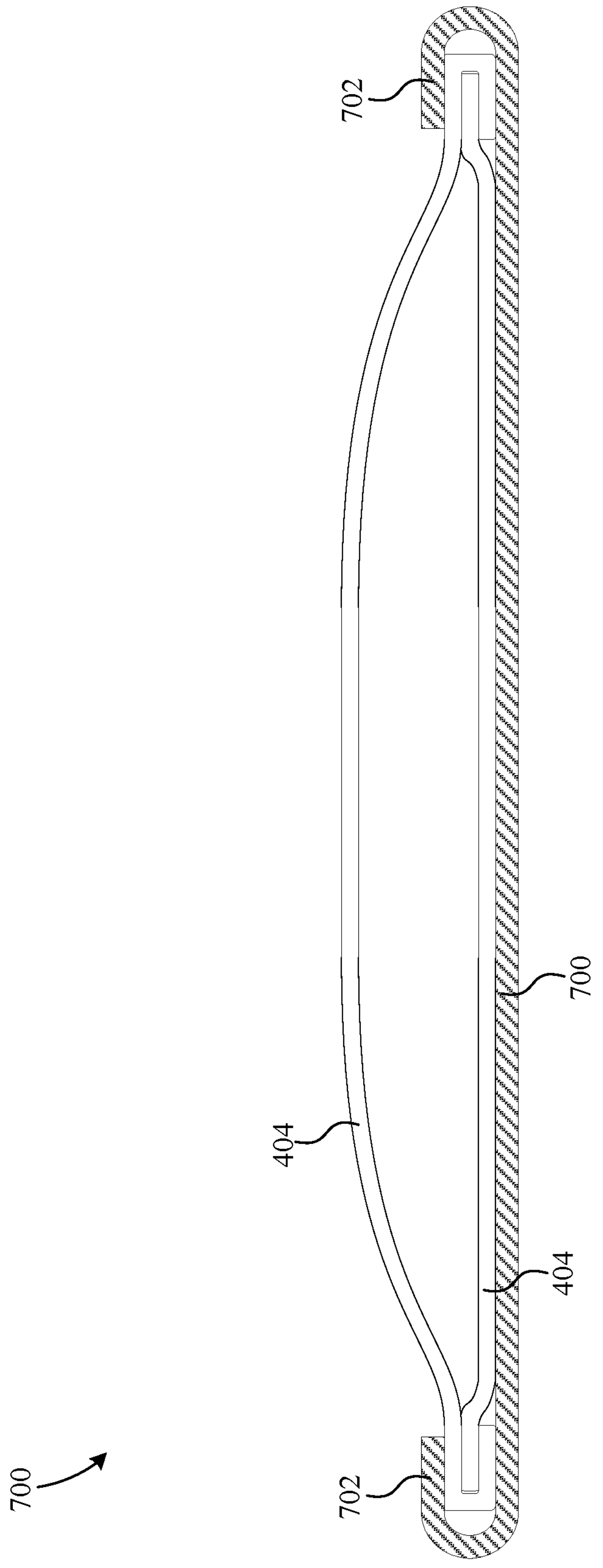
FIG. 7 is a top view of a firearm holder and a door stopper according to another embodiment of the present invention.

FIG. 7 shows a top view of holder 404 mounted to an alternate stopper 700 of receptacle 100, according to another embodiment of the present invention. In this example, the securing of holder 404 to stopper 700 is achieved by crimping the sides 702 of stopper 700 around the edges of holder 404. This not only eliminates the need for screws 422 but also makes receptacle 100 tamper proof.

Figure 8:
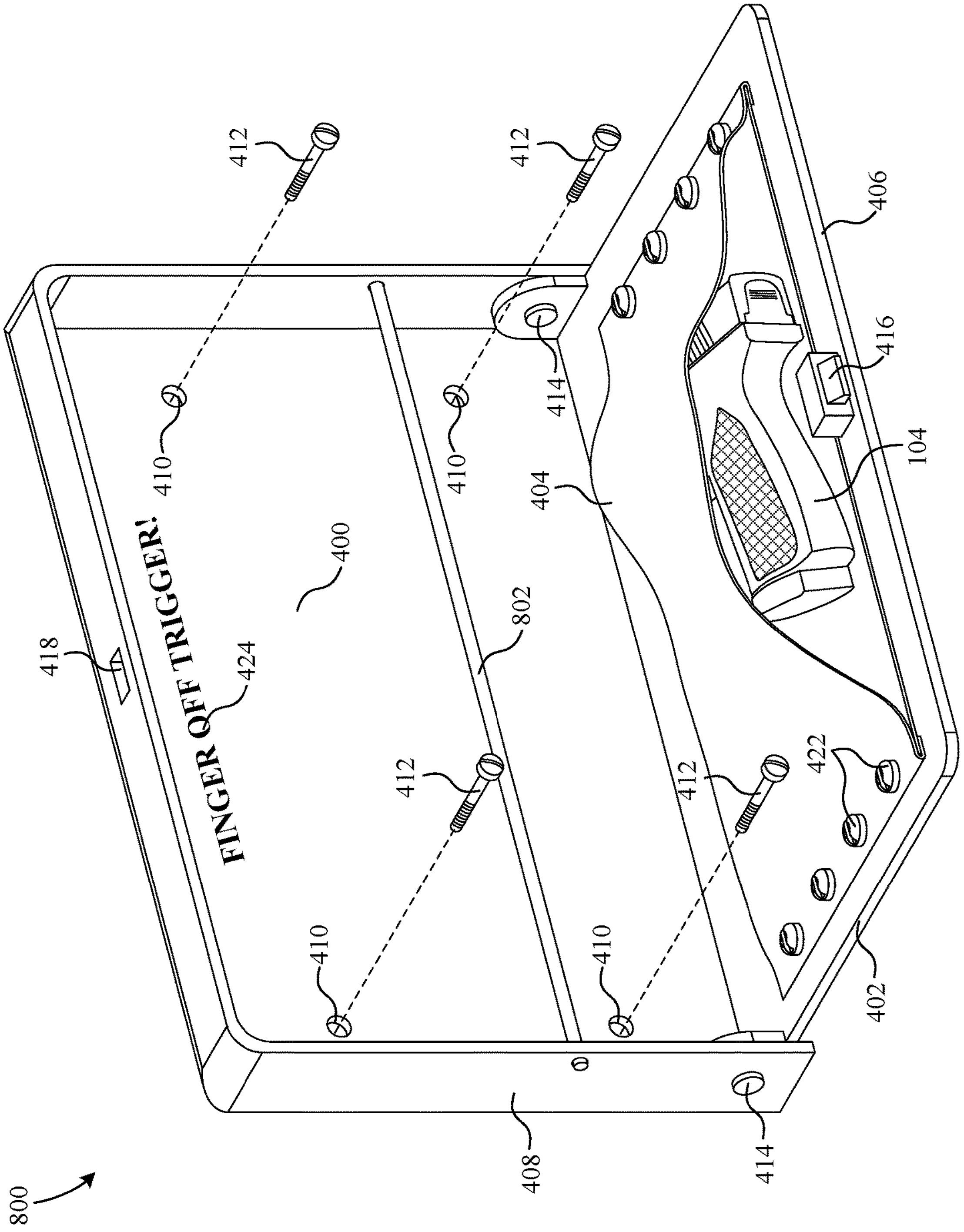
FIG. 8 is a perspective view of a firearm receptacle according to another embodiment of the present invention.

FIG. 8 shows a perspective view of a firearm receptacle 800 according to yet another embodiment of the present invention. Firearm receptacle 800 is substantially identical to receptacle 100 except that receptacle 800 further includes a safety feature 802 that additionally prevents receptacle 800 from being closed while firearm 104 (or an unusually narrow firearm) is in holder 404. This prevents accidentally forgetting a firearm in receptacle 100. Safety feature 802 is, for example, a bar passing through sidewalls 408. Bar 802 prevents stopper 402 from being closed when there is a firearm in holder 404. Alternatively, bar 802 can be replaced by simply designing mounting structure 400 to have a very shallow depth such that stopper 402 cannot close unless holder 404 is empty.

Figure 9:
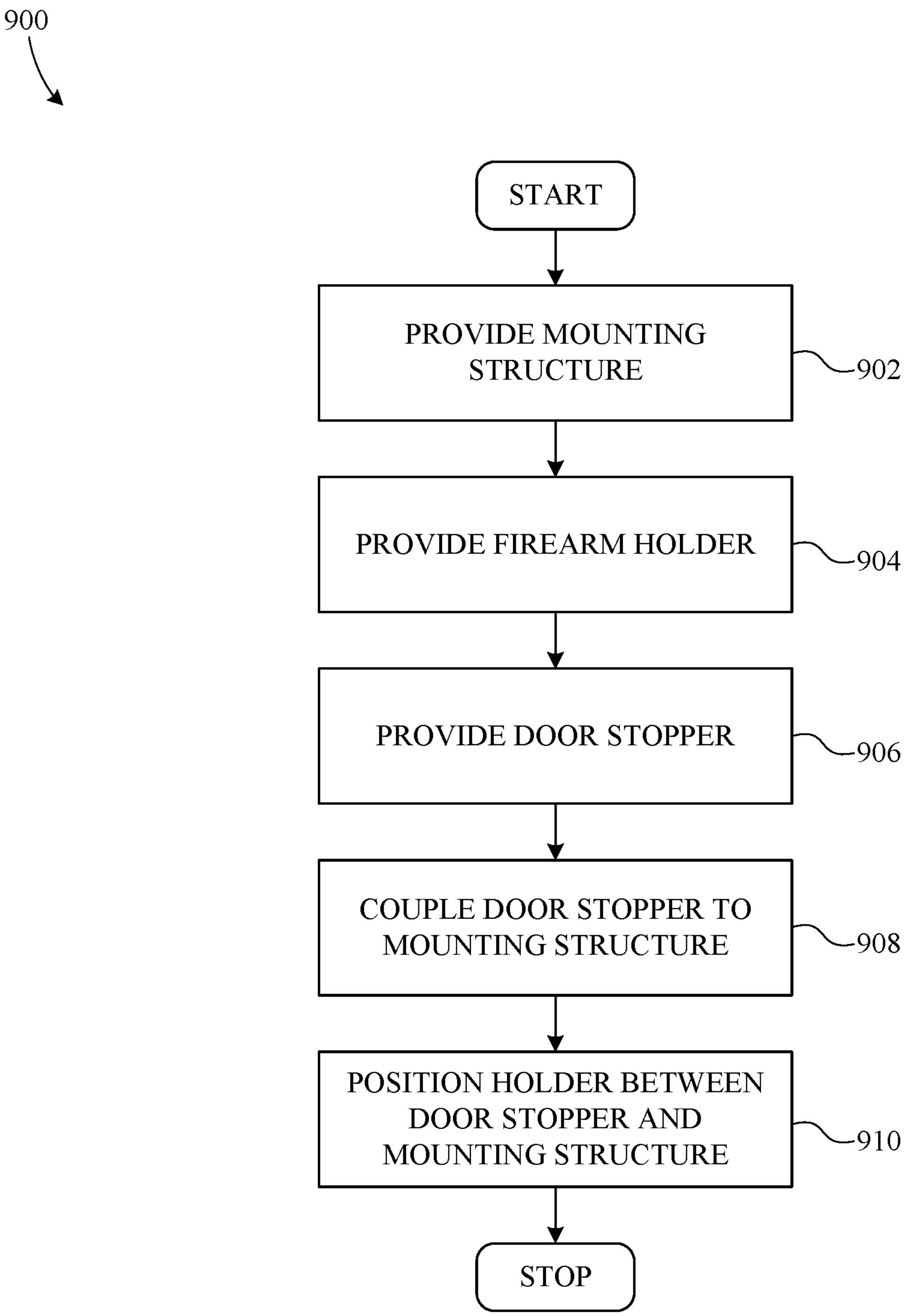
FIG. 9 is a flowchart summarizing a method of manufacturing a firearm receptacle.

FIG. 9 is a flowchart summarizing a method 900 for manufacturing a firearm receptacle. In a first step 902, a mounting structure is provided. Then, in a second step 904, a firearm holder is provided. Next, in a third step 906, a door stopper is provided. Then, in a fourth step 908, the door stopper is coupled to the mounting structure. Finally, in a fifth step 910 the firearm holder is positioned between a portion of the door stopper and a portion of the mounting structure, to limit the approach of the door stopper to the mounting structure while a firearm is in the firearm holder.

The description of particular embodiments of the present invention is now complete. Many of the described features may be substituted, altered or omitted without departing from the scope of the invention. For example, receptacle 100 can be formed from various suitable metals such as steel and/or aluminum (e.g. 16 gauge steel/aluminum sheet metal). As another example, receptacle 100 can be formed from molded composite materials. As yet another example, firearm holder 404 can be replaced with a holder (e.g., hook, pouch, flat platform, and so on) for holding other objects (clothing, cell phones, purses, and other personal items) that a person would not want to accidentally leave in the stall/enclosure. In addition, when in the deployed position, receptacle 100 provides additional security for person in the stall/enclosure by making it more difficult to open the door. These and other deviations from the particular embodiments shown will be apparent to those skilled in the art, particularly in view of the foregoing disclosure.

I claim:

1. A firearm receptacle comprising:

a mounting structure configured to be fixably mounted to one of a wall or a door;

a firearm holder; and a door stopper coupled to said mounting structure and configured to transition between a deployed position and a stowed position; and wherein said firearm holder is disposed in a space between said door stopper and said mounting structure when said door stopper is in said stowed position; and said space between said door stopper and said mounting structure is sufficiently small to prevent said door stopper from transitioning to said stowed position when a BROWNING HI-POWER™ pistol is disposed in said firearm holder.

2. The firearm receptacle of claim 1, wherein:

said door stopper includes a platform hingably coupled to said mounting structure;

said platform is configured to rotate no more than ninety degrees when transitioned between said deployed position and said stowed position; and said firearm holder is disposed between a portion of said platform and a portion of said mounting structure.

3. The firearm receptacle of claim 2, wherein said firearm holder is fastened to said platform.

4. The firearm receptacle of claim 3, wherein said firearm holder is a collapsible pouch.

5. The firearm receptacle of claim 2, further comprising a latch including a first portion coupled to said mounting structure and a complementary second portion coupled to said platform, said first portion and said second portion being free to engage one another when said firearm holder is empty, said first portion and said second portion being prevented from engaging one another when said BROWNING HI-POWER™ pistol is disposed in said firearm holder.

6. The firearm receptacle of claim 1, wherein said firearm holder is configured to point a firearm held therein in a downward direction when said door stopper is in said deployed position.

7. The firearm receptacle of claim 1, wherein said firearm holder is formed from flexible ballistic material.

8. A method for manufacturing a firearm receptacle, said method comprising:

providing a mounting structure configured to be fixably mounted to one of a wall or a door;

providing a firearm holder;

providing a door stopper configured to transition between a deployed position and a stowed position;

coupling said door stopper to said mounting structure; and mounting said firearm holder in a space between said door stopper and said mounting structure such that said door stopper cannot transition to said stowed position when a BROWNING HI-POWER™ pistol is disposed in said firearm holder.

9. The method of claim 8, wherein said step of providing said door stopper includes providing a platform; and said step of coupling said door stopper to said mounting structure includes hingably coupling said platform to said mounting structure.

10. The method of claim 9, wherein said step of mounting said firearm holder between said door stopper and said mounting structure includes fastening said firearm holder to said platform or said mounting structure.

11. The method of claim 10, wherein said firearm holder is a collapsible pouch.

12. The method of claim 9, further comprising:

providing a latch including a first portion and a complementary second portion;

coupling said first portion to said mounting structure;

coupling said second portion to said platform; and wherein said first portion and said second portion are free to engage one another when said firearm holder is empty; and said first portion and said second portion are prevented from engaging one another when said BROWNING HI-POWER™ pistol is disposed in said firearm holder.

13. The method of claim 8, further comprising providing a limiter to maintain said firearm holder in a predetermined position where a firearm disposed therein is pointed in a downward direction.

14. The method of claim 8, wherein said step of providing said firearm holder includes forming said firearm holder from flexible ballistic material.

15. A walk-in enclosure for use by a person carrying a firearm, said enclosure comprising:

one or more walls;

a door coupled to at least one of said walls;

a firearm receptacle fixed to said door or one of said walls, said firearm receptacle being transitionable between a stowed position and a deployed position, said firearm receptacle including a firearm holder transitionable between a collapsed state and an expanded state; and wherein said firearm receptacle is configured to prevent transition from said deployed position to said stowed position while a BROWNING HI-POWER™ pistol is disposed in said firearm holder;

said firearm receptacle is free to transition into said stowed position while no firearm is disposed in said firearm holder;

said firearm receptacle impedes the opening of said door when said firearm receptacle is in said deployed position; and said firearm receptacle does not impede the opening of said door when said firearm receptacle is in said stowed position.

16. The walk-in enclosure of claim 15, wherein said firearm receptacle includes:

a mounting structure mounted to one of said walls or said door;

a door stopper disposed to prevent the opening of said door when said firearm receptacle is in said deployed position; and said firearm holder disposed to prevent said firearm receptacle from transitioning from said deployed position to said stowed position while said BROWNING HI-POWER™ pistol is present in said firearm holder.

17. The walk-in enclosure of claim 16, wherein said door stopper includes a platform hingably coupled to said mounting structure.

18. The walk-in enclosure of claim 17, wherein said firearm holder is fastened to said platform.

19. The walk-in enclosure of claim 18, wherein said firearm holder is a collapsible pouch.

20. The walk-in enclosure of claim 16, wherein said firearm holder is formed from flexible ballistic material.

21. The walk-in enclosure of claim 18, wherein said walk-in enclosure is a restroom stall.

* * * * *